(12) United States Patent
Witte et al.

(10) Patent No.: US 6,206,622 B1
(45) Date of Patent: Mar. 27, 2001

(54) SYSTEM FOR CHUCKING WORKPIECES

(75) Inventors: Horst Witte, Nahrendorf; Andreas Witte, Blecked, both of (DE)

(73) Assignee: Horst Witte Entwicklungs- und Vertriebs-KG, Nahrendorf (DE)

( * ) Notice: Subject to any disclaimer, the term of this patent is extended or adjusted under 35 U.S.C. 154(b) by 0 days.

(21) Appl. No.: 09/335,138

(22) Filed: Jun. 17, 1999

(30) Foreign Application Priority Data

Jul. 10, 1998 (DE) .......................................... 298 12 280 U
Apr. 17, 1999 (EP) .................................................. 99107716

(51) Int. Cl.[7] ................................ B23C 9/00; B23Q 3/00
(52) U.S. Cl. .......................... 409/225; 269/900; 409/219
(58) Field of Search ..................................... 409/235, 337, 409/344, 276, 277, 278, 286, 219; 403/7, 11, 18, 19, 231, 230, 373, 322.1, 322.4, 374.3, 170, 217, 219; 279/106; 269/48.1, 43, 45, 290, 900; 74/89.14; 82/149; 408/234

(56) References Cited

U.S. PATENT DOCUMENTS

| | | | |
|---|---|---|---|
| 3,841,781 | * | 10/1974 | Mengeringhausen .................. 408/35 |
| 4,012,153 | * | 3/1977 | Pidgeon et al. ....................... 403/170 |
| 4,073,215 | * | 2/1978 | Coope et al. ..................... 269/321 A |
| 4,228,628 | * | 10/1980 | Schlomann .............................. 52/438 |
| 4,616,966 | * | 10/1986 | Ohyama ................................. 409/132 |
| 4,886,257 | * | 12/1989 | Witte ........................................ 269/9 |
| 5,222,377 | * | 6/1993 | Squires ................................. 251/148 |
| 5,556,242 | * | 9/1996 | Sheldon et al. ...................... 409/132 |
| 5,762,326 | * | 6/1998 | Swann ..................................... 269/43 |
| 6,059,485 | * | 5/2000 | Witte ................................. 403/322.1 |

FOREIGN PATENT DOCUMENTS

0222147A2 * 10/1986 (EP) .
2149047 * 10/1984 (GB) .

* cited by examiner

*Primary Examiner*—William Briggs
(74) *Attorney, Agent, or Firm*—Friedrich Kueffner

(57) ABSTRACT

A system for constructing devices for chucking workpieces in defined and reproducible positions on machine tools and measuring machines includes a mounting pipe which has grid points formed at regular coordinate distances and is provided in the longitudinal direction of the pipe with chamfers uniformly distributed over the circumference, wherein the grid points are formed on the chamfers in the form of concave spherical recesses, and wherein the center points of the spherical recesses are located on lines which extend parallel to the chamfers outside of the pipe body and which describe the ideal pipe shape.

5 Claims, 4 Drawing Sheets

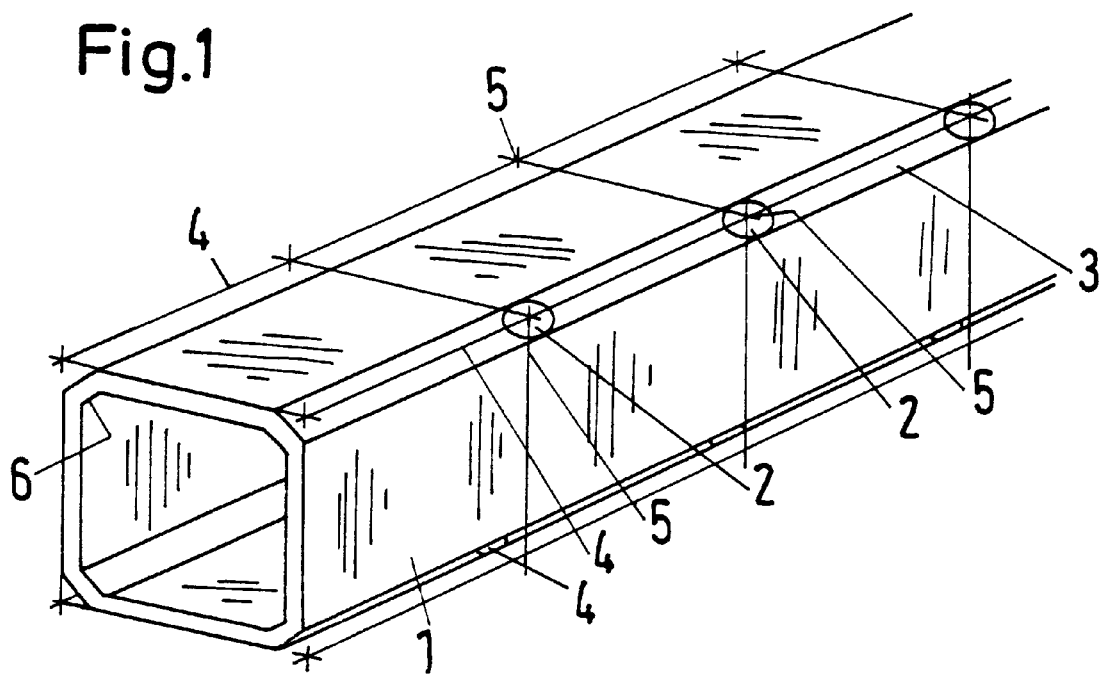
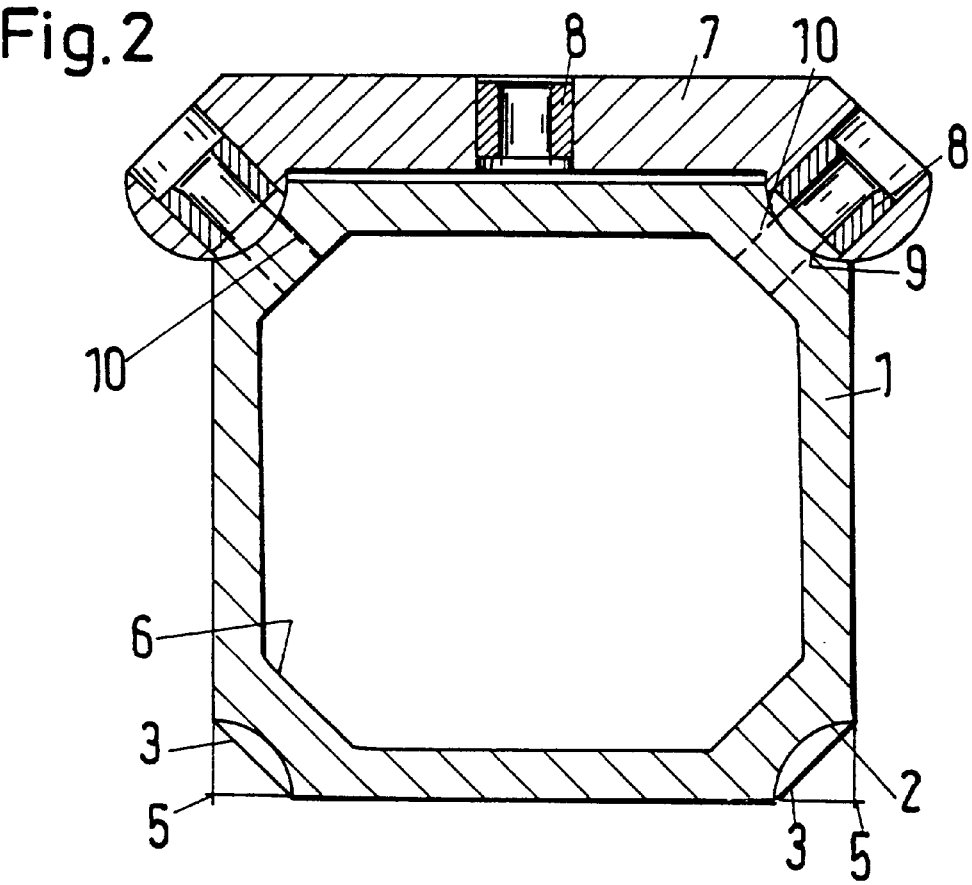

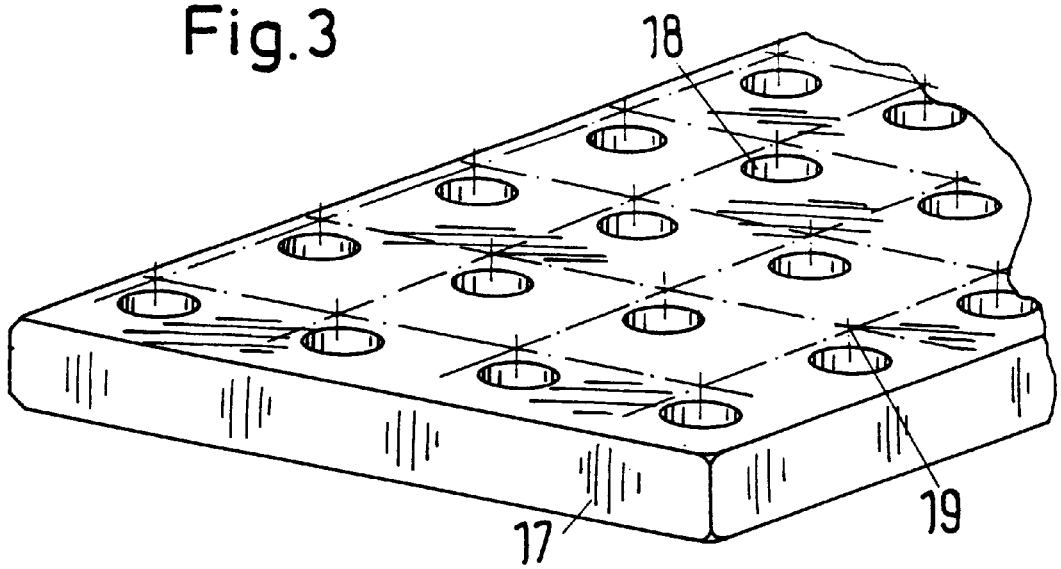
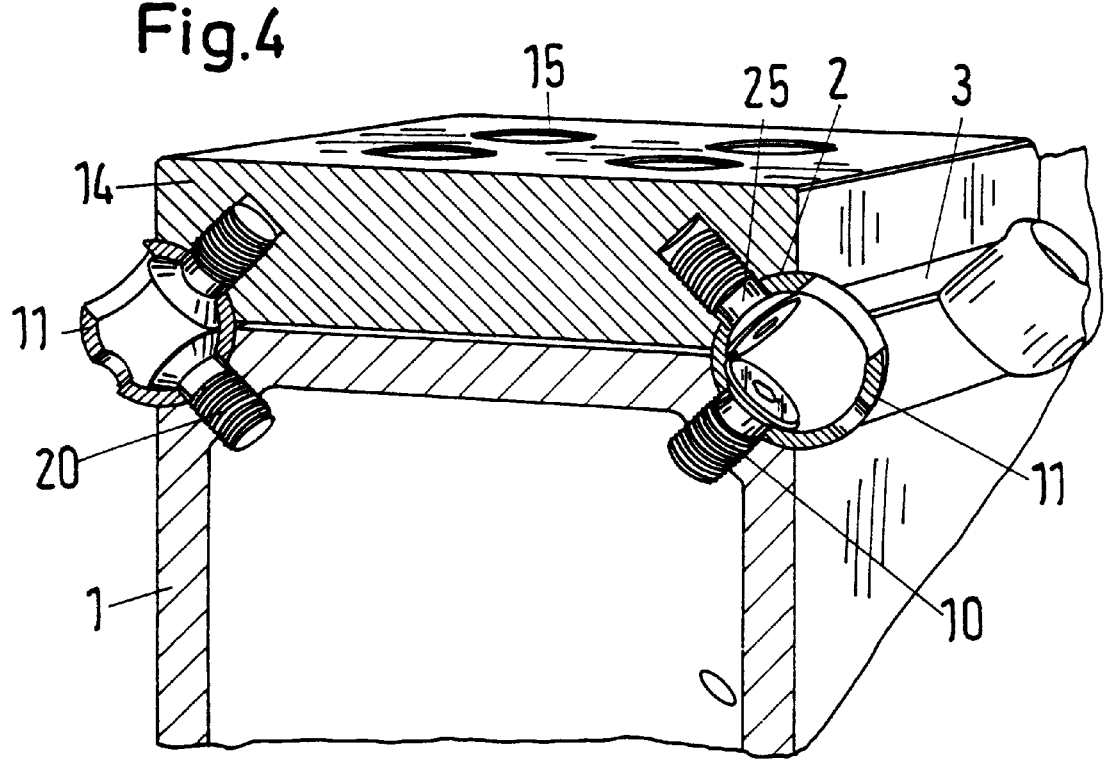

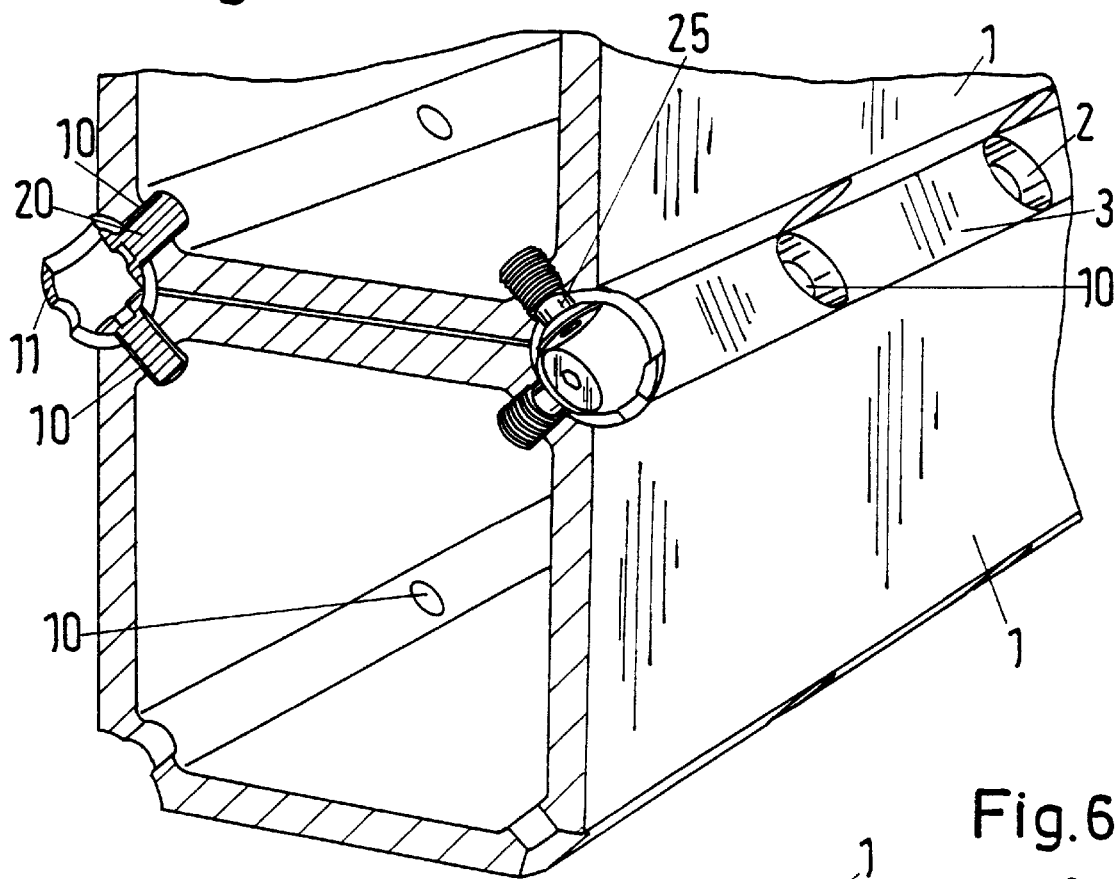
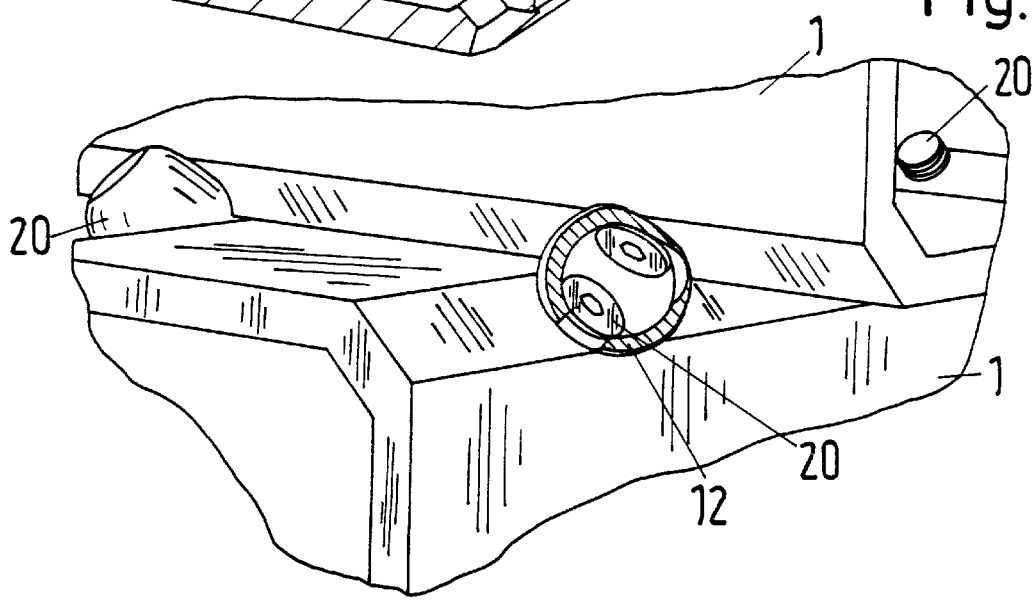

SYSTEM FOR CHUCKING WORKPIECES

BACKGROUND OF THE INVENTION

1. Field of the Invention

The present invention relates to a system for constructing devices for chucking workpieces in defined and reproducible positions on machine tools and measuring machines. In addition, the invention relates to a mounting pipe for such a system with grid points arranged at regular coordinate distances, and a corresponding base plate. The invention also relates to a connecting element and a connecting adapter for connecting such mounting pipes to each other, to a base plate or to an adapter plate.

2. Description of the Related Art

EP 222 147 B1 discloses a system of the above described type. The mounting pipes and the base plate of this known system have locating bores arranged at regular coordinate distances. These locating bores form grid points which establish a grid spacing. This grid spacing is provided in all three planes x, y and z.

The locating bores or transverse bores forming the grid points of this known system are provided in the mounting pipes so as to intersect in the four surfaces in a large number and with great precision, wherein the mounting pipes preferably have a parallelepiped shape with rectangular or square cross-section, and wherein these mounting components and possibly appropriate base plates make it possible to construct various spatial structures for mounting and measuring workpieces. The mounting pipes are manufactured from high-strength and extruded aluminum pipes which are subsequently mechanically processed for achieving the necessary precision. The section modulus of the components is reduced by the large quantity of locating bores and transverse bores.

Pipes of aluminum having not such a high strength can be drawn more precisely, however, the precision which is possible in mechanical processing cannot be achieved.

SUMMARY OF THE INVENTION

Therefore, it is the primary object of the present invention to provide a system of the above-described type, and mounting pipes, base plate and connecting elements for such a system, which can be manufactured less expensively with the same precision, and which make it possible to be used universally also in connecting with the known system according to EP 222 147 B1. In particular, it is the object of the invention to provide a mounting pipe which can be combined with known systems and which also forms a significant component of a new less expensive system.

In accordance with the present invention, the mounting pipe for constructing devices for chucking workpieces in a defined and reproducible position, which has grid points formed at regular coordinate distances, is provided in the longitudinal direction of the pipe with chamfers uniformly distributed over the circumference, wherein the grid points are formed on the chamfers in the form of concave spherical recesses, and wherein the center points of the spherical recesses are located on lines which extend parallel to the chamfers outside of the pipe body and which describe the ideal pipe shape.

In accordance with another feature, the mounting pipe has the shape of a parallelepiped with a rectangular or square crosssection, wherein the chamfers are formed by bevelling the edges and the lines on which the center points of the concave spherical recesses are the lines of intersection of adjacent surfaces of the parallelepiped having the ideal shape.

Pipes having square or rectangular cross-sections are the most frequently used type, although circular or polygonal pipes in which the chamfers and concave spherical recesses are formed can also be used.

The mounting pipe according to the invention is manufactured by extruding it with the chamfers at the four edges of the parallelepiped. For ensuring a sufficiently high accuracy, it is sufficient to extrude this pipe from a type of aluminum alloy which does not have to meet highest requirements with respect to strength. Mechanical processing is limited to providing the spherical recesses which ensure the precision in all three planes. The cross-section of the mounting pipe with the chamfers and the fact that it is always only necessary to drill as many fastening bores as are required, make it possible to manufacture the pipe of an aluminum alloy which does not have such a high strength. When the actual shape of the pipe deviates from the ideal shape, for example, as a result of slight twisting, the center points are always located on the ideal shape, so that, when using the concave spherical recesses as grid points, the grid spacing always corresponds to the ideal shape. Consequently, the inaccuracies which occur during the manufacture, particularly when extruding the pipe, are insignificant when constructing the system according to the invention. In other words, the center points of the concave spherical recesses are not located on the points of intersection of the adjacent side surfaces of the actual pipe, but rather of the ideal shape of the pipe. Accordingly, the actual surface area of the spherical recess in the chamfer may vary. The important fact is that all center points of the spherical recesses are located on the ideal line.

When such a mounting pipe is to be used for constructing the system described above, fastening bores are drilled by means of drilling devices either in the spherical recesses, i.e., in the axes extending through the center points, or in the side surfaces of the mounting pipe. These drilling devices have convex spherical projections which are arranged in accordance with the grid spacing and which rest in the concave spherical recesses of the pipe. This ensures once again that the fastening bores are drilled in accordance with the ideal shape of the mounting pipe. Deviations from the ideal shape are compensated during drilling of the fastening bores, so that fastening itself always takes place very precisely in accordance with the ideal shape.

In accordance with another feature, the parallelepiped has an internal contour which follows the external contour provided with the chamfers in such a way that the internal contour has inclined surfaces extending parallel to the chamfers. These inclined surfaces provide an additional reinforcement.

The base plate according to the present invention has on at least one side thereof concave spherical recesses forming the grid points, wherein the center points of the spherical recesses are located on lines which intersect perpendicularly in accordance with the grid spacing and which define the ideal plate shape.

The adapter plate according to the invention to be connected to a mounting pipe or to a base plate has on two oppositely located side surfaces chamfers with concave spherical recesses as they are provided in the mounting pipe described above. Accordingly, the adapter plate is dimensioned and provided with a chamfer and corresponding concave spherical recesses in such a way that it can be connected to the mounting pipe for fastening appropriate structural components. The adapter plate can also be used for mounting a drilling device.

The drilling device, whether starting from the adapter plate or provided with convex spherical projections, can also be used for drilling bores in the base plate.

The fastening bores are basically only drilled in the mounting pipe and in the base plate as they are required for mounting a specific system. This significantly reduces the number of bores which would mean weakening of the system; in addition, the costs of the system are lowered. If these components are later to be used for constructing another system, additional fastening bores can be drilled as required.

The connecting element according to the present invention for connecting mounting pipes to each other or to a base plate is composed of a hollow sphere whose outer diameter is equal to the diameter of the concave spherical recesses. The hollow sphere has a large insertion bore whose diameter is greater than the diameter of the head of the corresponding fastening screw. The hollow sphere additionally has a first fastening bore located approximately opposite the large insertion bore and a second fastening bore located at an angle of at least 90° relative to the first fastening bore and in the same plane as the insertion bore and the first fastening bore. Located in the same plane is a small tool bore located approximately opposite the first fastening bore.

For connecting two components to construct a device of the above-described type, initially a fastening screw is inserted through the insertion bore into the hollow space of the hollow sphere and is placed in one of the fastening bores and is screwed into the thread of the fastening bore of the selected concave spherical recess. However, the screw connection is not yet made tight. Subsequently, the second fastening bore is inserted and is passed through the free second fastening bore and is screwed into the thread of the component to be connected. This process is then repeated for any additional, preferably three, connecting elements having the shape of hollow spheres. When the connection is effected to this extent, the screws are tightened. As a result, the components to be connected inevitably assume the exact desired position relative to each other because the outer diameter of the hollow sphere corresponds to the diameter of the concave spherical recess. The insertion bore and the tool bore serve to insert tools, for example, a hexagon socket screw key.

The angles at which the bores are arranged relative to each other, particularly the fastening bores, depends on which components are to be connected to each other. When two mounting pipes are to be connected parallel to each other, the angle between the fastening bores is 90°. When two mounting pipes are to be connected at a right angle relative to each other, the angle between the fastening bores is 120°. If a connection is made between a mounting pipe and a base plate, a connecting element in the form of a hollow sphere is selected in which the angle between the fastening bores is 135°.

It is also possible to provide more than two fastening bores. In that case, the at least one additional fastening bore is located in a plane which extends essentially perpendicularly of the plane in which the other fastening bores are located.

In accordance with another feature, one of the fastening bores of the connecting element has a thread which corresponds to the thread in the corresponding fastening screw. This makes it possible to screw the fastening screw ahead of time into the fastening bore having the thread, wherein the fastening screw has a recess between the thread and the head, so that the screw is placed loosely and movably in the threaded bore but cannot fall out. As a result, the fastening screw assumes a position which facilitates the first connection to a corresponding structural component of the system.

For connecting two structural components to construct a device of the above-described type, usually four connecting elements in the form of appropriately configured hollow spheres are required.

For constructing a system according to the present invention, mounting pipes, a base plate and/or an adapter plate above can be used.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a perspective view of an embodiment of a mounting pipe according to the present invention;

FIG. 2 is a sectional view, on a larger scale, showing the mounting pipe of FIG. 1 with a drilling device for drilling fastening bores mounted on the pipe;

FIG. 3 is a partial perspective view of an embodiment of a base plate according to the invention;

FIG. 4 is a partial perspective view, on a larger scale, showing the connection of a mounting pipe of FIG. 1 to an adapter plate which basically is constructed in accordance with the principle of the mounting pipe, wherein connecting elements in the form of hollow spheres are also shown in section;

FIG. 5 is a view corresponding to FIG. 4, however, showing a connection between two mounting pipes which extend parallel to each other;

FIG. 6 is a partial perspective view showing a connection of two mounting pipes extending perpendicularly of each other;

DESCRIPTION OF THE PREFERRED EMBODIMENTS

Figure 7:
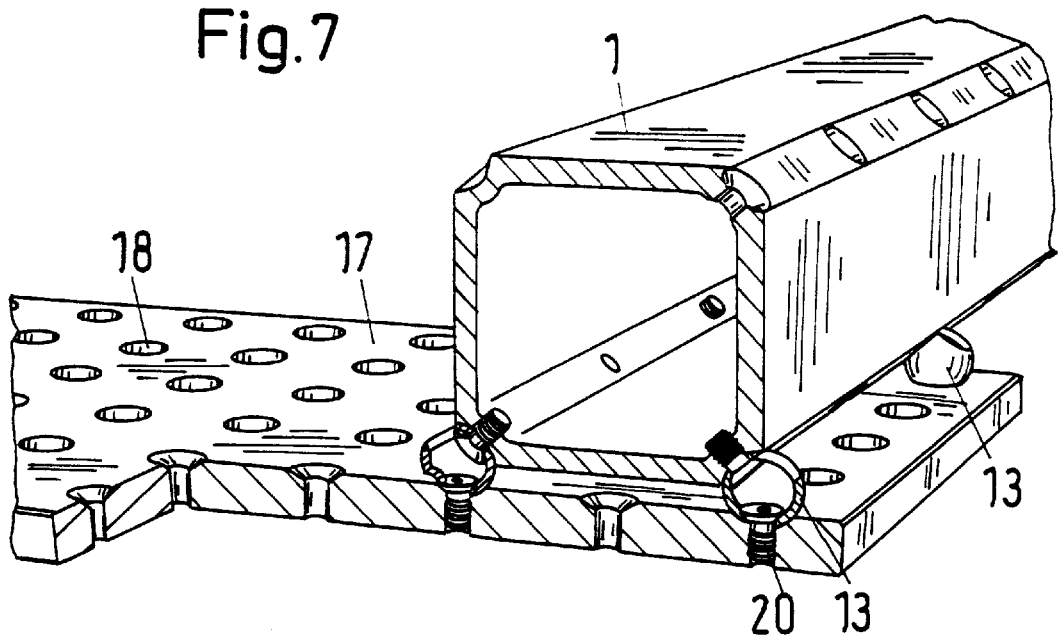
FIG. 7 is a perspective view, partially in section, showing a connection of a base plate according to FIG. 3 to a mounting pipe according to FIG. 1.

FIG. 1 of the drawing shows an embodiment of a mounting pipe 1 according to the present invention. In this embodiment, the mounting pipe has a square cross-section. The mounting pipe 1 is manufactured from an extruded aluminum alloy and only the concave spherical recesses are produced by mechanical processing. The edges have at 3 a relatively large chamfer. The internal contour follows these edge chamfers by inclined surfaces 6 in the corners.

The grid points required for constructing a system are formed by the concave spherical recesses 2 which are provided in accordance with a regular pattern in all three planes x, y and z. The center points 5 of the spherical recesses 2 are not located on the actual points of intersection of the sides of the respective pipe, but on the points of intersection of the sides of the ideal shape 4. When the shape of the pipe deviates from the ideal shape, which frequently cannot be avoided when extruding the pipe, the center points 5 are located on the ideal shape 4, i.e., the surface areas of the concave spherical recesses 2 differ in accordance with the location of the center point 5. Accordingly, the center points 5 of the spherical recesses describe in the embodiment of FIG. 1 an ideal exact pipe with a square cross-section.

Of course, the pip e may also have a rectangular or another regular cross-section. Basically, a circular shape is also possible. However, the pipe with four edges is the most suitable shape.

The mounting pipe according to FIG. 1 has concave spherical recesses 2 arranged at regular coordinate distances at the circumference, wherein the center points of the spherical recesses 2 are located on lines 4 which are formed by the intersections of the sides of the corresponding ideal square pipe.

This mounting pipe is suitable for constructing a system for constructing devices for chucking workpieces in defined and reproducible positions. The mounting pipe can either be combined with conventional systems, or it serves to form a system according to the present invention together with other mounting pipes and special connecting elements.

In order to complete the mounting pipe 1 with the concave spherical recesses 2 in the chamfer surfaces 3 arranged at regular coordinate distances for constructing a system, a drilling template 7 is used, as illustrated in FIG. 2, for manufacturing fastening bores 10 which may be provided with a thread. This drilling template 7 has four spherical legs with convex spherical projections 9 which are arranged with the grid spacing predetermined by the concave spherical recesses 2. As can be clearly seen in FIG. 2, the axes on which the center points of the spherical projections 9 are located are inclined by 45°. This drilling template 7 is placed with its spherical projections 9 on the concave spherical recesses 2 of a mounting pipe according to FIG. 1 and assumes a precisely defined position which is determined by the shape of the ideal pipe because the center points of the concave spherical recesses 2 are located on the ideal intersection lines 4 of the corresponding mounting pipe 1.

Provided in the drilling device are drilling sleeves 8 which make it possible to drill fastening bores in the pipe. These bores are not yet shown in FIG. 1. The fastening bores may be drilled at an angle of 45° through the concave spherical recesses, or, for example, perpendicularly through a side wall of the mounting pipe 1. If the mounting pipe 1 is to be combined with a conventional system, the fastening bores are preferably drilled in the side wall. If the mounting pipe 1 is to be used for a system with other mounting pipes 1 of the type shown, the fastening bores are drilled in the concave spherical recesses 2.

FIG. 4 of the drawing shows a mounting pipe 1 and an adapter plate 14 mounted on the mounting pipe 1. This adapter plate 14 is essentially dimensioned in the same way as the mounting pipe 1. The adapter plate 14 is provided with a chamfer 3 and with concave spherical recesses 2 in accordance with the grid spacing. The adapter plate 14 serves to mount different structural components which are to be fastened to the system which is composed of the base plate and mounting pipes. For this purpose, the adapter plate 14 is provided with fastening bores 15.

In FIG. 5, another mounting pipe 1 is mounted instead of the adapter plate on the lower mounting pipe 1. The two mounting pipes extend parallel to each other.

In accordance with the configuration of FIG. 6, the two mounting pipes 1 which are connected to each other extend perpendicularly of each other.

FIG. 7 shows a mounting pipe 1 mounted on a base plate 17 as it is illustrated in FIG. 3.

The connection of the individual structural components takes place by means of connecting elements in the form of hollow spheres. If the chamfers 3 of the components to be connected extend parallel to each other, as is the case in the embodiments of FIGS. 4 and 5, a hollow sphere 11 is used as it is shown in the sectional view in FIG. 8.

Figure 9:
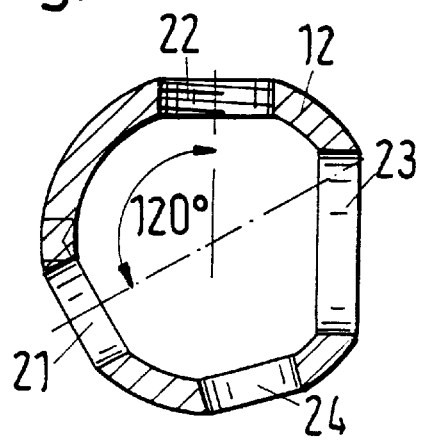
FIG. 9 is a sectional view corresponding to FIG. 8, showing a hollow sphere for connecting two mounting pipes which extend perpendicularly of each other.

When two mounting pipes 1 which extend transversely or perpendicularly of each other, as shown in FIG. 6, are to be connected to each other, the connection is effected by means of connecting elements in the form of hollow spheres 12 as they are shown in the sectional view in FIG. 9.

Figure 10:
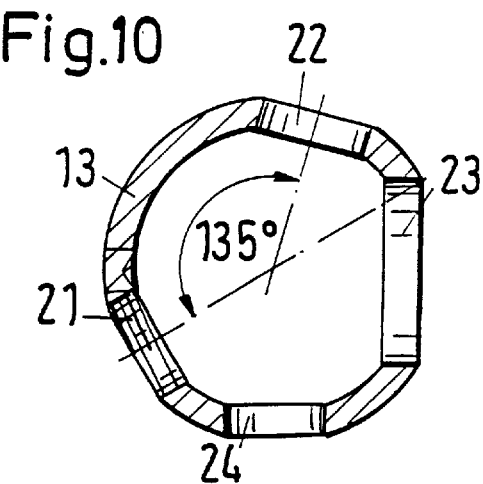
FIG. 10 is a sectional view corresponding to FIGS. 8 and 9 showing a hollow sphere for connecting a base plate to a mounting pipe.

When a base plate is to be connected to a mounting pipe, connecting elements in the form of hollow spheres 13 are used as they are shown in the sectional view in FIG. 10.

Preferably four hollow spheres of the same type are used for connecting two components. Only the fastening bores extend at different angles relative to each other.

Each hollow sphere has an external diameter which is equal to the diameter of the concave spherical recess 2, so that the sphere rests with full surface contact against the corresponding spherical recess. Each hollow sphere 11, 12, 13 is provided with an insertion bore 23 whose diameter is such that a fastening screw 20 with a head can be inserted into the interior of the sphere. At least two fastening bores 21 and 22 are provided. In addition, a tool bore 24 is provided which has a somewhat smaller diameter because it is only necessary to pass therethrough a tool, for example, a hexagon socket screw key. As is apparent from FIGS. 8 through 10, these bores are located in a plane.

Figure 8:
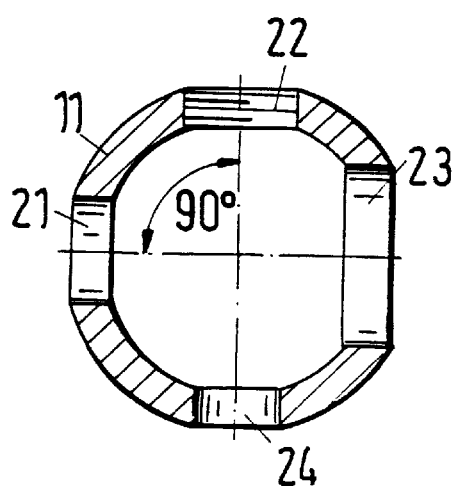
FIG. 8 is a sectional view of an embodiment of a connecting element in the form of a hollow sphere, particularly for connecting two mounting pipes which extend parallel to each other.

In the various configurations according to FIGS. 8, 9 and 10, the bores merely assume in this plane different angles relative to each other. In the hollow sphere 11 of FIG. 8, the four bores extend at an angle of 90° relative to each other. In the embodiment of the hollow sphere 12 according to FIG. 9, the angle between the fastening bores 21 and 22 is 120°. In the embodiment of the hollow sphere 13 according to FIG. 10, the angle between the fastening bores 21 and 22 is 135°.

It is also possible to provide more than two fastening bores in a hollow sphere. These additional bores are then located in another plane.

As is apparent from FIGS. 8 through 10, always one of the fastening bores 21 or 22 is provided with a thread. This thread corresponds to the thread of the corresponding fastening screw 20. The fastening screw 20 has between its thread and head a recess 25, as can be seen in FIGS. 4 and 5. This makes it possible to mount a fastening screw "loosely" in the hollow sphere ahead of time because the screw can be screwed into the fastening bore 22 after it has been passed through the insertion opening 23. However, because of the recess 25, the screw is movable to a limited extent, so that its position can be adjusted during the assembly.

In order to obtain a connection, for example, of two mounting pipes 1 as illustrated in FIG. 5, at first four hollow spheres 11 are connected to one of the mounting pipes by means of fastening screws which were premounted in the respective fastening bore 22. Subsequently, the other fastening screws are inserted into the interior of the spheres and the spheres are secured in the required position using the appropriately positioned screws. Then the connection to the second mounting pipe is effected. Subsequently, the screws are tightened. Positioning takes place exclusively through the contact of the spheres against the spherical recesses. Any special adjustment is not required.

The connection between two mounting pipes 1 which extend perpendicularly of each other, as shown in FIG. 6, is effected in the same manner merely by using hollow spheres 12 as they are shown in FIG. 9. The angle between the fastening bores 21 and 22 is different in this case because the geometric conditions are different because of the perpendicular extension of one of the mounting pipes.

The same is true for the connection between a base plate 17 with a mounting pipe 1 as shown in FIG. 7. In that case, the angle between the fastening bores of the hollow sphere 13 as shown in FIG. 10 is even greater.

By using usually four hollow spheres, a precise and reproducible connection can be obtained. These components inevitably assume the desired and correct position relative to each other. Special adjustments when making the connection are not required.

While specific embodiments of the invention have been shown and described in detail to illustrate the inventive principles, it will be understood that the invention may be embodied otherwise without departing from such principles.

We claim:

1. A system for constructing devices for chucking workpieces in a defined and reproducible position, the system comprising:

at least one mounting pipe having a longitudinal direction and a circumference, the mounting pipe having chamfers extending in the longitudinal direction and uniformly distributed over the circumference of the mounting pipe, wherein the mounting pipe has first concave spherical recesses provided in the chamfers and wherein the first concave spherical recesses define arid points of the mounting pipe located at regular coordinate distances, wherein the first concave spherical recesses have center points located on lines extending parallel to the chamfers and outside of the mounting pipe, wherein the lines describe an ideal shape of the pipe;

a base plate having second concave spherical recesses having central points located on intersecting lines intersecting perpendicularly in accordance with a grid pattern, wherein the second concave spherical recesses define grid points of the base plate, which grid points of the base plate are located at regular coordinate distances matching the regular coordinate distances of the grid points of the mounting pipe, wherein the intersecting lines describe an ideal shape of the base plate; and a plurality of connecting elements each comprised of a hollow sphere having an outer diameter, wherein the first and second concave spherical recesses have a diameter, wherein the outer diameter of the hollow sphere is equal to the diameter of the first and second concave spherical recesses;

the hollow sphere having a large insertion bore having a diameter greater than a diameter of a head of a fastening screw to be passed through the insertion bore, a first fastening bore located approximately opposite the insertion bore, a second fastening bore located at an angle of at least 90° relative to the first fastening bore, wherein the second fastening bore is located in a first plane with the insertion bore and the first fastening bore, and a small tool bore located in the first plane approximately opposite the first fastening bore.

2. The system according to claim 1, wherein the ideal shape of the mounting pipe is a parallelepiped with a rectangular or square cross-section, wherein the chamfers are formed by bevels of edges of the mounting pipe, and wherein the lines on which the center points of the first concave spherical recesses are located define lines of intersection of adjacent surfaces of the parallelepiped extending in the longitudinal direction.

3. The system according to claim 2, wherein the mounting pipe has an inner contour with inclined surfaces at corners of the internal contour, wherein the inclined surfaces extends parallel to the chamfers.

4. The system according to claim 1, wherein the hollow sphere has, additionally to the first and the second fastening bores, at least one further fastening bore which is positioned in a second plane substantially perpendicularly to the first plane.

5. The system according to claim 4, wherein one of the fastening bores has a thread matching that of the corresponding fastening screw.

* * * * *